US008409711B2

(12) United States Patent
Selph et al.

(10) Patent No.: US 8,409,711 B2
(45) Date of Patent: Apr. 2, 2013

(54) HEAT RESISTANT PHOSPHATE CEMENT

(75) Inventors: Jeffrey L. Selph, Cary, NC (US); James W. Paul, Jr., Mechanicsville, VA (US)

(73) Assignee: Grancrete, Inc., Cary, NC (US)

( * ) Notice: Subject to any disclaimer, the term of this patent is extended or adjusted under 35 U.S.C. 154(b) by 0 days.

(21) Appl. No.: 13/617,602

(22) Filed: Sep. 14, 2012

(65) Prior Publication Data

US 2013/0008349 A1 Jan. 10, 2013

Related U.S. Application Data

(63) Continuation of application No. 12/570,232, filed on Sep. 30, 2009, now Pat. No. 8,273,172.

(60) Provisional application No. 61/103,263, filed on Oct. 7, 2008.

(51) Int. Cl.
*B32B 13/00* (2006.01)

(52) U.S. Cl. ........................................ 428/404; 428/703

(58) Field of Classification Search .................. 428/404, 428/703; 106/690, 691, 801, DIG. 2
See application file for complete search history.

(56) References Cited

U.S. PATENT DOCUMENTS

| | | | |
|---|---|---|---|
| 3,879,209 A | 4/1975 | Limes et al. |
| 3,960,580 A | 6/1976 | Stierli et al. |
| 4,432,799 A | 2/1984 | Salazar |
| 4,504,555 A | 3/1985 | Prior et al. |
| 4,541,870 A | 9/1985 | Barrett, Jr. |
| 4,592,966 A | 6/1986 | Prior et al. |
| 4,792,359 A | 12/1988 | Barrall et al. |
| 4,842,649 A | 6/1989 | Heitzmann et al. |
| 4,956,321 A | 9/1990 | Barrall |
| 5,002,610 A | 3/1991 | Sherif et al. |
| 5,080,022 A | 1/1992 | Carlson |
| 5,114,617 A | 5/1992 | Smetana et al. |
| 5,311,945 A | 5/1994 | Cowan et al. |
| 5,597,120 A | 1/1997 | Chess, Jr. |
| 5,645,518 A | 7/1997 | Wagh et al. |
| 5,718,757 A | 2/1998 | Guillou et al. |
| 5,788,762 A | 8/1998 | Barger et al. |
| 5,830,815 A | 11/1998 | Wagh et al. |
| 5,846,894 A | 12/1998 | Singh et al. |
| 6,136,088 A | 10/2000 | Farrington |
| 6,153,809 A | 11/2000 | Singh et al. |
| 6,204,214 B1 | 3/2001 | Singh et al. |
| 6,264,740 B1 | 7/2001 | McNulty, Jr. |
| 6,290,769 B1 | 9/2001 | Carkner |
| 6,458,423 B1 | 10/2002 | Goodson |
| 6,475,275 B1 | 11/2002 | Nebesnak et al. |
| 6,498,119 B2 | 12/2002 | Wagh et al. |
| 6,518,212 B1 | 2/2003 | Wagh et al. |
| 6,561,269 B1 | 5/2003 | Brown et al. |
| 6,719,993 B2 | 4/2004 | Constantz |
| 6,776,837 B2 | 8/2004 | Wagh et al. |
| 6,783,799 B1 | 8/2004 | Goodson |
| 6,790,518 B2 | 9/2004 | Grace et al. |
| 7,045,476 B1 | 5/2006 | Lally |
| 7,160,383 B2 | 1/2007 | Wagh et al. |
| 7,204,880 B1 | 4/2007 | Turner et al. |
| 7,288,148 B2 | 10/2007 | Hicks et al. |
| 7,429,290 B2 | 9/2008 | Lally |
| 2002/0009622 A1 | 1/2002 | Goodson |
| 2003/0041785 A1 | 3/2003 | Harrison |
| 2003/0127025 A1 | 7/2003 | Orange et al. |
| 2003/0131759 A1 | 7/2003 | Francis et al. |
| 2004/0194657 A1 | 10/2004 | Lally |
| 2005/0000393 A1 | 1/2005 | Virtanen |
| 2005/0016421 A1 | 1/2005 | Fujimori et al. |
| 2005/0160944 A1 | 7/2005 | Wagh et al. |
| 2005/0229809 A1 | 10/2005 | Lally |
| 2005/0274290 A1 | 12/2005 | Wagh et al. |

FOREIGN PATENT DOCUMENTS

| | | |
|---|---|---|
| DE | 19706743 A1 | 10/1997 |
| EP | 0217569 A2 | 4/1987 |
| WO | WO 02/24598 A2 | 3/2002 |
| WO | WO2008/008414 A1 | 1/2008 |

OTHER PUBLICATIONS

Notification of Transmittal of the International Search Report and the Written Opinion of the International Searching Authority, or the Declaration corresponding to PCT/US2007/015856 mailed Nov. 27, 2007.

Notification of Transmittal of the International Search Report and the Written Opinion of the International Searching Authority, or the Declaration corresponding to PCT/US2009/059317 mailed Feb. 2, 2010.

*Primary Examiner* — Paul Marcantoni
(74) *Attorney, Agent, or Firm* — Myers Bigel Sibley & Sajovec, P.A.

(57) ABSTRACT

An article of manufacture including reinforcement material embedded in a phosphate cement composition is provided. The phosphate cement composition includes about 10 to 40 percent by weight calcium or magnesium oxide, about 10 to 40 percent by weight acid phosphate, and about 10 to 50 percent by weight vermiculite or perlite or mixture thereof.

4 Claims, No Drawings

HEAT RESISTANT PHOSPHATE CEMENT

CROSS-REFERENCE TO RELATED APPLICATION

This application is a continuation of U.S. application Ser. No. 12/570,232, filed on Sep. 30, 2009 now U.S. Pat. No. 8,273,172, now allowed, which claims priority to U.S. Provisional Application Ser. No. 61/103,263, filed Oct. 7, 2008, the disclosures of which are incorporated by reference in their entirety.

FIELD AND BACKGROUND OF THE INVENTION

The present invention relates generally to a phosphate cement composition, and more particularly to a phosphate cement composition that cures rapidly, and is flame and heat resistant.

Cementious materials are used extensively in the construction industry for such uses as roadways, bridges, pools, walls, tunnels, and other structures which are exposed to the elements and need to maintain their strength. Portland cement has traditionally been the cement of choice. It is typically a mixture of water, calcined lime and silica. It is cheap to produce, easy to handle. There are, however, several disadvantages to Portland cement. Source materials often have inconsistent quality. Portland cement is often highly viscous which is acceptable for pouring and spreading, but is a major disadvantage if pumping or spraying is desired. Portland cement also has a slow cure rate.

Inasmuch as many applications require rapid curing without adversely affecting strength or other physical properties, there is a need for rapid curing cement compositions. Examples of previous attempts to provide such a rapid curing cement are provided in U.S. Pat. Nos. 3,879,209, 3,960,580, 5,002,610, and 6,136,088. There; however, remains a need for a cement composition that is rapidly curable and does not adversely affect physical properties like chemical stability, strength, corrosion, and the like.

An alternative to Portland cement is phosphate cement. Phosphate cement typically comprises an acid component such as phosphoric acid or an alkaline earth phosphate salt (e.g., magnesium phosphate), and a base component such as magnesium oxide. Phosphate cements tend to cure rapidly, and have excellent chemical stability and compressive strength.

SUMMARY OF THE INVENTION

A phosphate cement composition having excellent flame and heat resistance is provided. The phosphate cement composition comprises about 10 to 40 percent by weight calcium or magnesium oxide, about 10 to 40 percent by weight acid phosphate, and about 10 to 50 percent by weight of a granular material that expands on heating such as vermiculite or perlite. In another embodiment, 15 to 45 percent by weight wollastonite can be included.

DETAILED DESCRIPTION OF THE INVENTION

The foregoing and other aspects of the present invention will now be described in more detail with respect to other embodiments described herein. It should be appreciated that the invention can be embodied in different forms and should not be construed as limited to the embodiments set forth herein. Rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise. Also, as used herein, "and/or" refers to and encompasses any and all possible combinations of one or more of the associated listed items. Furthermore, the term "about," as used herein when referring to a measurable value such as an amount of a compound, dose, time, temperature, and the like, is meant to encompass variations of 20%, 10%, 5%, 1%, 0.5%, or even 0.1% of the specified amount. Unless otherwise defined, all terms, including technical and scientific terms used in the description, have the same meaning as commonly understood by one of ordinary skill in the art to which this invention belongs.

The phosphate cement composition of the present invention has a short cure time, is sprayable and pourable, is a barrier to moisture, has high compressive strength and flexural strength as compared to Portland cement, is resistant to corrosion from salt and can withstand heat exceeding 2000° F. without adversely affecting physical properties such as compression strength.

The composition comprises calcium or magnesium oxide, acid phosphate, and a granular material that expands on heating, e.g., vermiculite or perlite. In one embodiment, the composition comprises about 10 to 40 percent by weight calcium or magnesium oxide, about 10 to 40 percent by weight acid phosphate, and about 10 to 50 percent by weight vermiculite or perlite. A mixture of the above can be made into a slurry using 20 to 50 pounds of composition (water) per 100 pounds of dry mix depending on the desired flowability. Alternatively wollastonite can be added to the composition. If wollastonite is used, the vermiculite and/or perlite is added at a 2:1 to 5:1 by weight range.

Various granular compositions may optionally be added. Exemplary granular compositions include sand, $SiO_2$, $TiO_2$, $Al_2O_3$, $ZrO_2$, $Cr_2O_3$, talc, mica, kaolin, fly ash, meta kaolin, dolomite, chromium ore, clinker, cellulose, silica, and slag. Mixtures or blends of these may be used. The particle size is typically 0.5 to 300 μm. Typically the composition will have 0 to 25 percent by weight of one or more of these compositions. Fiber reinforcement such as polypropylene, polyester, polyaramid, polyamide, polyvinyl alcohol, fiberglass, steel, and carbon may also be included to provide a reinforced article of manufacture.

Suitable additives may also be mixed with the phosphate cement composition and typically the amounts added may be from about 0.1 to about 30 percent by weight. Exemplary additives include flame retardants, emulsifiers, deflocculates, sequestrates, accelerators (e.g. Accelguard available from The Euclid Chemical Company, Cleveland, Ohio) colorants and pigments, fillers, aggregates, borax, silica materials, iron oxides, bonding adhesives (e.g., Eucopoxy Resin and Eucoweld available from The Euclid Chemical Company, Cleveland, Ohio, Flexcon, and Corr-bond) plasticizers, hardeners (e.g., Euco Diamond Hard available from The Euclid Chemical Company, Cleveland, Ohio), patching polymers (e.g., Eucorapid patch available from The Euclid Chemical Company, Cleveland, Ohio), micro silica fume (e.g., Eucoshot available from The Euclid Chemical Company, Cleveland, Ohio), setting retarders, surface softeners, curing compounds (e.g., Brownstone CS), water reducers (e.g., Accelguard, Eucon AC), and air entrainers (e.g., AEA and Air Mix).

The resulting phosphate cement composition is sprayable and pumpable. It has a short cure time of 10 to 50 minutes, and often 20 to 40 minutes depending on ambient temperature and amount of water used and the water temperature. The phosphate cement composition of the invention adheres to most other materials. Thus suitable substrates include other cements (Portland and phosphate), brick, rock, metals, wood, insulation foam materials, asphalt, roofing materials, cloth/textile materials (including carpets, burlap, canvas), straw materials, drywall/gypsum. The material also bonds to itself. This allows thickness to be increased as well as repairs to existing material without having a seam or joint.

The phosphate cement composition can be applied by spraying or pumping horizontally or vertically. The composition can be applied to a wide variety of substrates and can be used, for example, for coating walls, floors, roads, road repairs, columns, pools, roofs, levees, bridges, patios, driveways, furniture, domes, retaining walls, and the like. The composition can be applied in structured forms to create landscape/hardscape items, walkways, furniture, pipes, counter tops, statues and other useful items.

In one embodiment, the phosphate cement composition of the invention can be used to spray coat structural steel reinforced concrete beams. The composition can improve the load carrying of the beam under a fire event as compared to an untreated structural concrete beam. In another embodiment, the phosphate cement composition of the invention can be used to coat a carbon fiber reinforced beam. The carbon fiber reinforcement can be in the form of carbon fibers embedded in an epoxy resin such as described in U.S. Pat. No. 6,790,518 and assigned to Lawrence Technological University, the disclosure of which is incorporated by reference in its entirety. The composition of the invention can be used to maintain the strength of carbon fibers by protecting the carbon fibers from the heat. Stated otherwise, the phosphate cement composition of may act as a means insulating the carbon fibers from the heat. Although the inventors do not wish to be bound by any one theory, it is believed that the vermiculite or perlite uses the moisture absorbed thereby to maintain the temperature below about 212° F. for a significant period of time.

The following examples are merely illustrative of the invention, and is not limiting thereon.

EXAMPLES

Example 1

A phosphate cement composition was made comprising 24 percent by weight magnesium oxide, 27 percent by weight monopotassium phosphate, 29 percent by weight wollastonite and 20 percent by weight vermiculite. The sample was applied to a 14"×14"×⅛" thick steel plate at on average dry thickness of 1068 mils. Heat endurance was measured using a modified ASTM E119 protocol. The temperature of the exposed side was gradually increased to about 2,000° F. At 2 hours and 38 minutes, the thermocouples on the unexposed side exceeded an average of 1,000° F.

Example 2

A phosphate cement composition was made comprising 27 percent by weight magnesium oxide, 27 percent by weight monopotassium phosphate, 14 percent by weight fly ash, 12 percent by weight kaolin, and 20 percent by weight vermiculite. The sample was applied to a 14"×14"×⅛" thick steel plate at on average dry thickness of 1.5 inches. Heat endurance was measured using a modified ASTM E119 protocol. The temperature of the exposed side was gradually increased to about 2,000° F. At 190 minutes, the furnace was turned off as none of the failure criteria had been met.

Example 3

The phosphate cement composition of Example 1 was spray coated onto a steel reinforced concrete beam to a thickness of about two inches. The coated concrete beam was allowed to cure for about 60 days. The fire test was performed according to ASTM-E119. The formed concrete beams were loaded under a three-point-load configuration. The concentrated load at the mid-span section was set to 6500 lb (50% of the ultimate load carrying capacity of the beam). An array of thermocouples were placed or implanted on the beams: exterior, under the insulation, and inside the beam on a rebar. Similar beam without insulation layer was tested under the same loading/fire conditions. The beam without insulation failed after two hours due to breaking of the bottom steel reinforcing bars with the temperature of the steel bars reaching 1100° F. For the beam coated with Example 1, the fire test lasted for six hours. During this fire test period, the beam was able to sustain the 6500 lb load without any signs of failure. By the end of the six hours, the temperature of the steel reached an average of 950° F. This test thus showed significant improvement of the load carrying of the beam under a fire event.

Example 4

The phosphate cement composition of Example 1 was spray coated on a carbon fiber rebar reinforced concrete beam as an insulation. The carbon fiber reinforcement is a proprietary fabric described in U.S. Pat. No. 6,790,518.

ASTM-E119 was used to test the insulation efficacy of the composition. It was found that it is possible to maintain the strength of the strengthening fabric, carbon fiber, in case of fire events for as long as 2 hours 40 minutes by protecting the fabric with the composition of the invention. This fire insulation coating effectively protected the fabric under fire events for a significant period of time. The study also demonstrated that the epoxy in the carbon fibers/epoxy matrix can sustain more than 75% of its ultimate load carrying capacity at temperature of 212° F. for extended period of time.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed.

What is claimed is:

1. An article of manufacture comprising a reinforcement material embedded in a phosphate cement composition comprising about 10 to 40 percent by weight calcium or magnesium oxide, about 10 to 40 percent by weight acid phosphate, and about 10 to 50 percent by weight vermiculite or perlite or mixture thereof.

2. The article of manufacture according to claim 1, wherein the reinforcement is steel rebar.

3. An article of manufacture comprising a reinforcement material embedded in a phosphate cement composition comprising about 10 to 40 percent by weight calcium or magnesium oxide, about 10 to 40 percent by weight acid phosphate, about 10 to 50 percent by weight of a material that expands on heating selected from the group consisting of vermiculite and perlite, or mixture thereof, and a composition comprising about 15 to 45 percent by weight wollastonite.

4. The article of manufacture according to claim 3, wherein the reinforcement material is steel rebar.

* * * * *